United States Patent [19]
Morganti et al.

[11] Patent Number: 5,850,521
[45] Date of Patent: Dec. 15, 1998

[54] APPARATUS AND METHOD FOR INTERPROCESSOR COMMUNICATION

[75] Inventors: Victor M. Morganti, Lincoln; Patrick E. Prange, Brookline; James B. Geyer, Natick; George J. Barlow, Tewksbury, all of Mass.

[73] Assignee: Bull HN Information Systems Inc., Billerica, Mass.

[21] Appl. No.: 689,655

[22] Filed: Apr. 23, 1991

Related U.S. Application Data

[63] Continuation of Ser. No. 311,363, Feb. 13, 1989, abandoned, which is a continuation of Ser. No. 869,147, May 30, 1986, abandoned.

[51] Int. Cl.$^6$ .................................................. G06F 15/167
[52] U.S. Cl. ...................... 395/200.38; 395/733; 395/741
[58] Field of Search ..................................... 395/800, 200, 395/375, 200.38, 680, 733, 740–742; 364/DIG. 1, DIG. 2

[56] References Cited

U.S. PATENT DOCUMENTS

| | | | |
|---|---|---|---|
| 3,678,467 | 7/1972 | Nussbaum et al. | 364/200 |
| 4,010,452 | 3/1977 | Cazanove | 364/200 |
| 4,041,461 | 8/1977 | Kratz et al. | 364/200 |
| 4,149,244 | 4/1979 | Anderson et al. | 364/200 |
| 4,223,380 | 9/1980 | Antonaccio et al. | 364/200 |
| 4,349,873 | 9/1982 | Gunter et al. | 364/200 |
| 4,365,294 | 12/1982 | Stokken | 364/200 |
| 4,376,973 | 3/1983 | Chivers | 364/200 |
| 4,385,351 | 5/1983 | Matsuura et al. | 364/200 |
| 4,394,727 | 7/1983 | Hoffman et al. | 364/200 |
| 4,467,412 | 8/1984 | Hoff | 364/200 |
| 4,470,113 | 9/1984 | Oura | 364/200 |
| 4,482,954 | 11/1984 | Vrielink et al. | 364/200 |
| 4,504,902 | 3/1985 | Gallaher et al. | 364/200 |
| 4,543,627 | 9/1985 | Schwab | 364/200 |
| 4,562,539 | 12/1985 | Vince | 364/200 |
| 4,598,356 | 7/1986 | Dean et al. | 364/200 |
| 4,648,030 | 3/1987 | Bomba et al. | 364/200 |
| 4,648,034 | 3/1987 | Heninger | 364/200 |
| 4,718,002 | 1/1988 | Carr | 364/200 |
| 4,731,736 | 3/1988 | Mothersole et al. | 364/900 |
| 4,862,351 | 8/1989 | Green et al. | 395/375 |
| 4,862,354 | 8/1989 | Fiacconi et al. | 364/200 |

FOREIGN PATENT DOCUMENTS

| | | | |
|---|---|---|---|
| 0154551 | 3/1985 | European Pat. Off. | G06F 15/16 |
| 0167454 | 6/1985 | European Pat. Off. | G06F 15/16 |

*Primary Examiner*—Paul V. Kulik
*Attorney, Agent, or Firm*—William W. Holloway; Faith F. Driscoll; John S. Solakian

[57] ABSTRACT

In order to provide communication between two processors in a data processing system, a target processor includes apparatus that can store data signal groups from a source processor. Having stored a data signal group from the source processor, the target processor notifies the source processor of the receipt of the data signal group. In response to the presence of the stored data signal group, the target processor executes a interprocessor command or instruction identified by the transferred data signal group. The source processor at a preselected time, executes an instruction to determine if the command designated by the data signal group stored in the target processor has been executed. The commands specified by the transferred data signal groups can be executed under hardware control by the target processor in a relatively short time immediately following completion of the instruction in execution in the target processor at the time of the transfer of the data signal group. The interprocessor communication has only a minor impact on the performance of the source processor and the target processor because of the command implementation by apparatus.

18 Claims, 3 Drawing Sheets

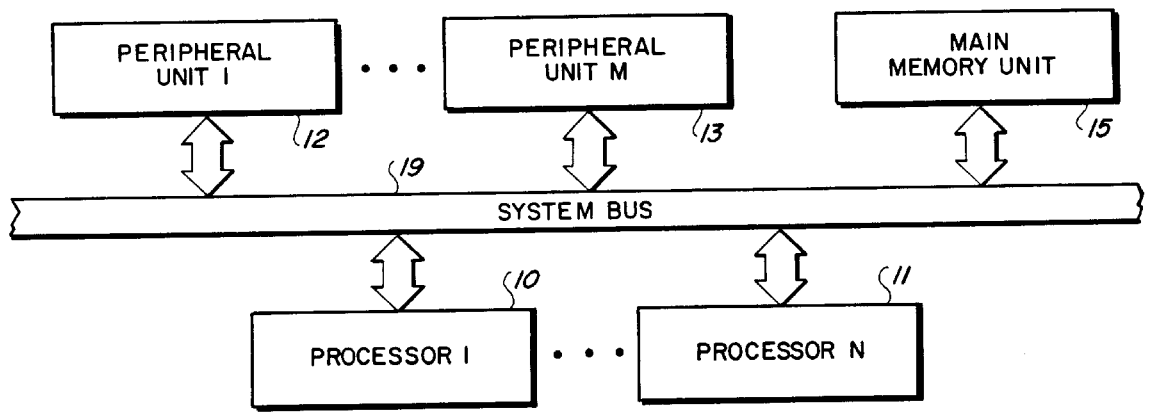
FIG. 1
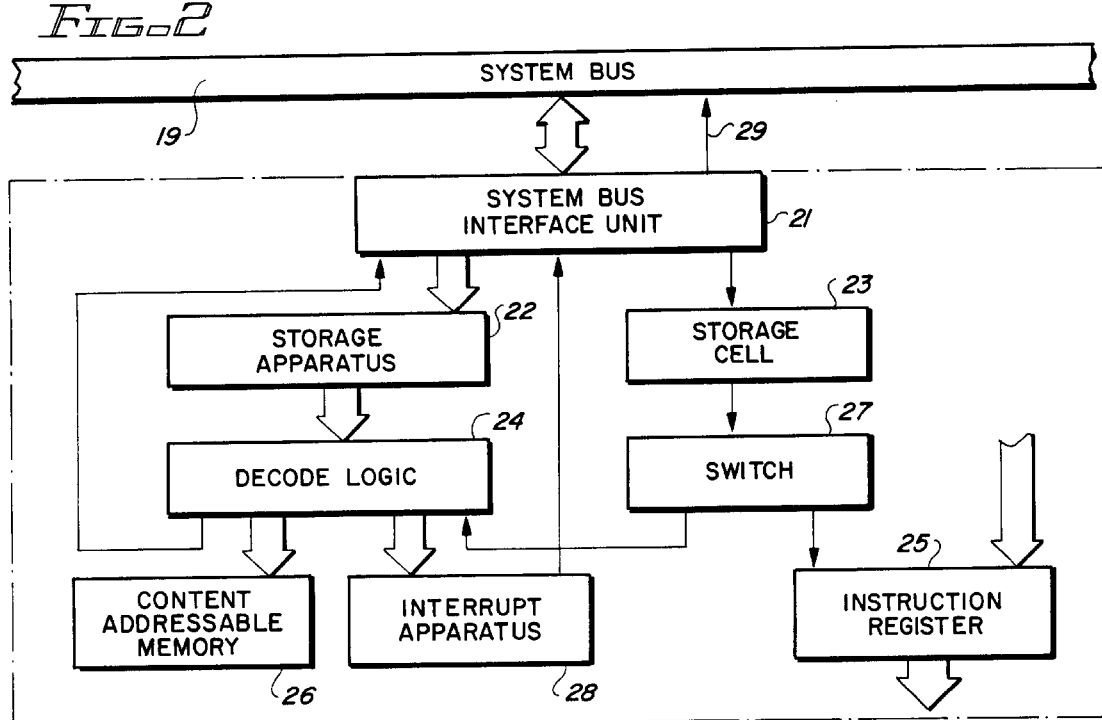
FIG. 2
FIG. 4
| IDENTIFICATION OF TARGET PROCESSOR | FUNCTION CODE | FUNCTION |
|---|---|---|
| " | 0 | FLUSH SEGMENT CONTENT ADDRESSABLE MEMORY |
| " | 1 | FLUSH SEGMENT CONTENT ADDRESSABLE MEMORY ENTRY |
| " | 2 | FLUSH PAGE CONTENT ADDRESSABLE MEMORY |
| " | 3 | SET ACTIVITY FLAG & INTERRUPT |
| " | 4 | FLUSH PAGE CONTENT ADDRESSABLE MEMORY ENTRY |

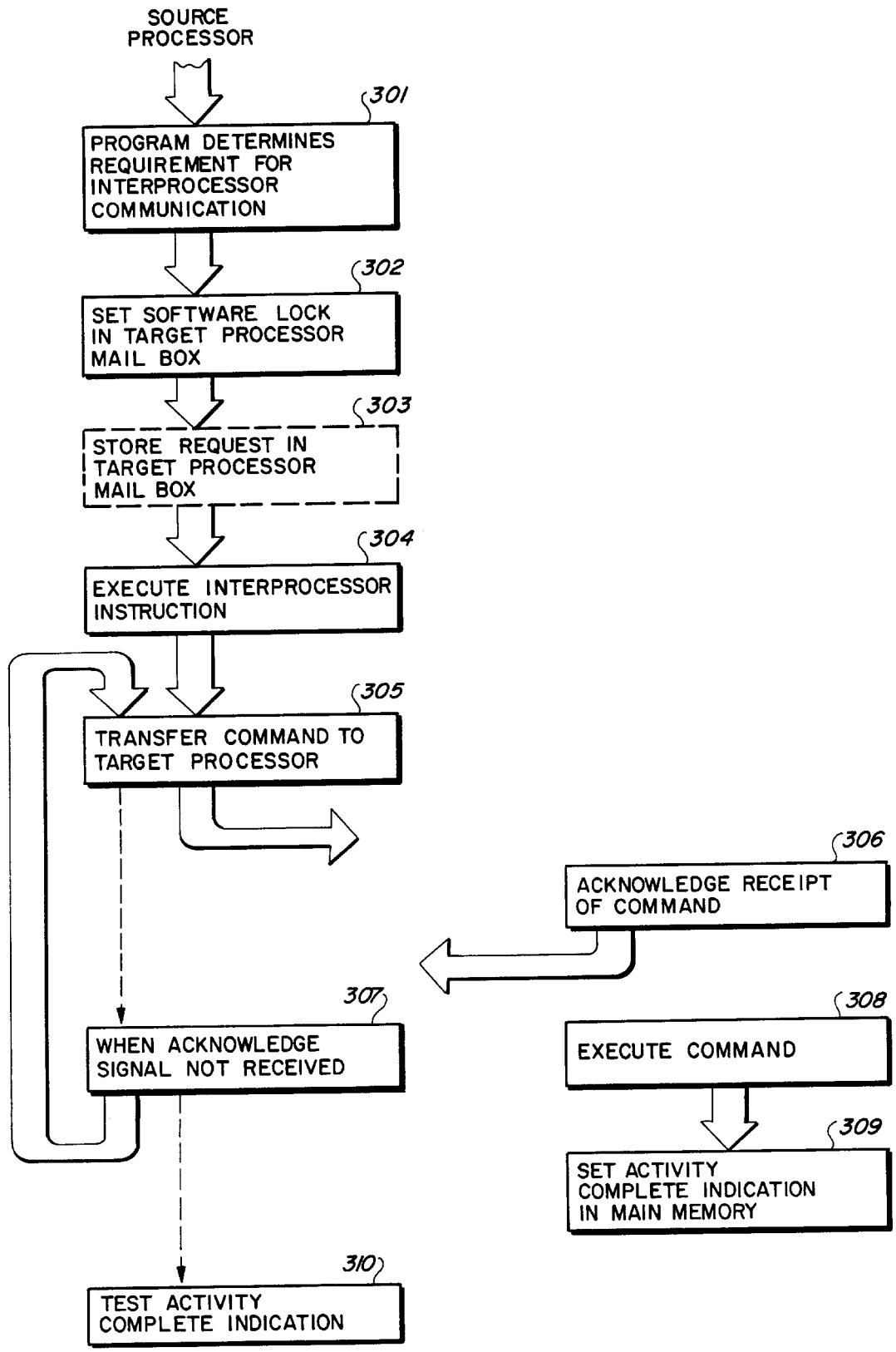

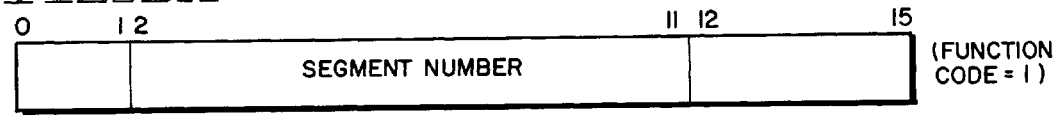
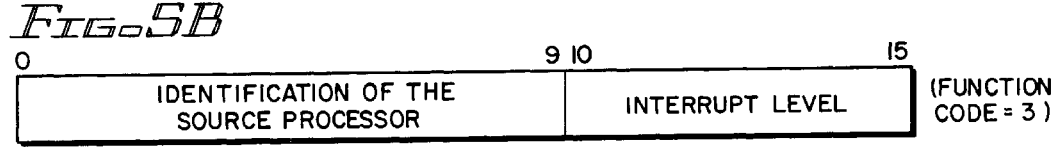
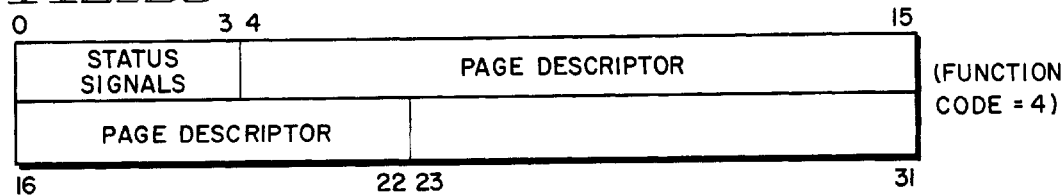
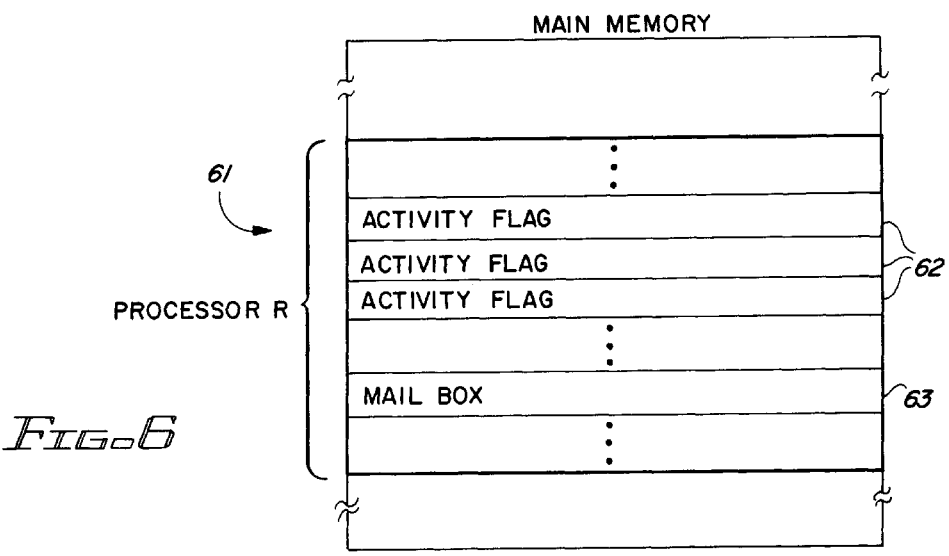
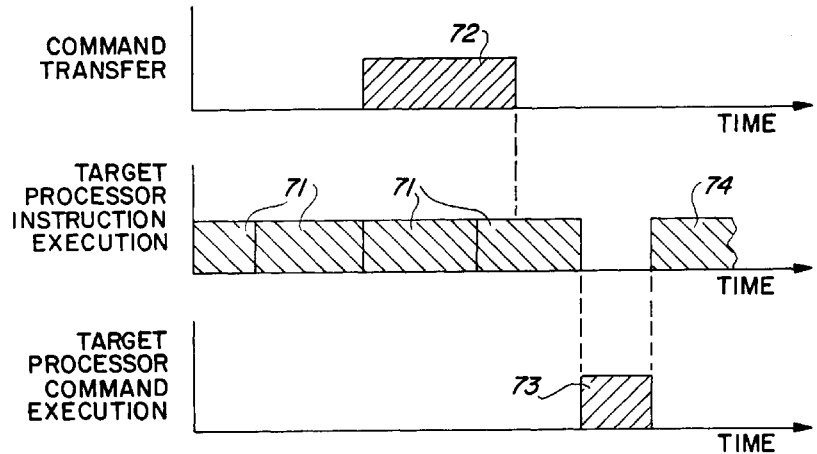

APPARATUS AND METHOD FOR INTERPROCESSOR COMMUNICATION

This is a continuation of application Ser. No. 07/311,363 filed on Feb. 13, 1989, now abandoned, which is a continuation of Ser. No. 06/869,147 filed May 30, 1986 now abandoned.

BACKGROUND OF THE INVENTION

1. Field of the Invention

This invention relates generally to data processing systems and, more particularly, to the communication between components of the data processing system, the components each having signal processing capability.

2. Discussion of the Related Art

As the complexity of the modern data processing systems has increased, the problems involved with the communication between processing components has similarly increased. Moreover, the need for this interprocessor communication has expanded. In the multiprocessor and multiprogrammed data processing environment, the exchange of information or the sharing of processing activity among system components is frequently required and the coordination of these activities results in the requirement for a protocol to provide for transfer of information between the processors. For example, a processor can have a content addressable memory associated therewith to facilitate address translation. In the multiprocessor system, the contents of the content addressable memory associated with each processor cannot be inconsistent. Inconsistencies can result in data processing system errors. When a first (source) processor performs a process that results in the change or invalidation of the contents of the content addressable memory associated with the first processor, then the contents of a content addressable memory of the second (target) processor are equivalent to the changed or invalidated memory contents of the first processor must be similarly changed or invalidated.

In order to provide this communication, the related art provides a potential target processor with storage apparatus, wherein a source processor can store signals indicative of the requirement for communication with the target processor by the source processor. The source processor stores signals representing the communication desired between the two processors in a predetermined location in main memory, typically referred to as the processor mailbox, and transfers signals to the storage apparatus in the target processor. The target processor, according to a prearranged protocol, reviews periodically the storage apparatus and, when a signal is found in the storage apparatus, the target processor retrieves the contents of a location in its mailbox. The contents of the mailbox identify the activity that the source processor is requesting the target processor to perform.

This procedure for interprocessor communication may have a significant impact on the performance. The target processor must first identify the presence of a communication request, must stop the current processing activity and call upon a software procedure to retrieve the contents of the mailbox, interpret the contents of the stored request and perform the activity indicated by the mailbox file contents. In addition, the source processor may suspend other activity in order to determine whether the activity requested by the source processor has been performed.

A need has therefore been felt for apparatus and method that would provide for interprocessor communication while minimizing the impact on system performance.

OBJECTS OF THE INVENTION

It is therefore an object of the present invention to provide an improved data processing system.

It is a feature of the present invention to provide apparatus and method for communication between processing components of the data processing system.

It is another feature of the present invention to permit execution of a instruction generated in a first processor by a second processor without intervention of a software program in the second processor.

It is a still further feature the present invention to provide for interprocessor communication in a data processing system that reduces the impact of the communication on the performance of the data processing system.

SUMMARY OF THE INVENTION

The aforementioned and other feature are obtained, according to the present invention, by providing apparatus in a target processor that can receive and store a command transmitted by a source processor via a system bus. The source processor receives a signal from the target processor when the command is stored in the storage apparatus. When the command is stored in the apparatus of the target processor, a status signal is generated in the target processor. When the target processor completes execution of a current instruction, the status signal causes the command or instruction stored in the target processor to be executed. After execution of the command, the target processor continues the instruction sequence in progress at the time that the command was entered in the target processor apparatus. The transferred command, in the preferred embodiment, can result in two types of activity in the target processor. The first type of activity is a modification of control data stored in the target processor, i.e. modification of data relating to address translation. The second type of activity is the performance of a function requested by the source processor, i.e. execution of the request stored in the target processor mailbox. The source processor can examine the main memory location, altered as a result of the command transmitted to the target processor, to ascertain that the command has been executed.

These and other features of the present invention will become apparent upon reading of the following discussion along with the drawings.

BRIEF DESCRIPTION OF THE DRAWINGS

FIG. 1 is a block diagram of a data processing system capable of utilizing the present invention.

FIG. 2 is a block diagram of a processor of a data processing system illustrating components used in the implementation of the present invention according to the preferred embodiment.

FIG. 3 is a flow diagram illustrating the communication between processors according to the present invention.

FIG. 4 is a diagram illustrating the format of the data signal groups associated with the transferred command that are transferred between the source processor and the target processor on the address lines of the system bus.

FIGS. 5a, 5b and 5c illustrate the format of data signal groups associated with the transferred command that are transferred on the data lines of the system bus.

FIG. 6 illustrates the organization of main memory locations associated with each processor that supports the operation of the present invention.

FIG. 7 is a time diagram illustrating the execution of the transferred command in relation to other data processing system activity.

DESCRIPTION OF THE PREFERRED EMBODIMENT

1. Detailed Description of the Figures

Referring now to FIG. 1, a data processing system capable of advantageously utilizing the present invention is shown. The data processing system includes at least two processors (illustrated by processor 10 and processor 11), a main memory unit 15, at least one peripheral interface unit (illustrated by peripheral unit 12 and peripheral unit 13) and a system bus 19. In the data processing system illustrated in FIG. 1, the main memory unit 15 stores the data signal groups to be manipulated by the processors. During initialization of the system, the storage space in the main memory unit 15 is divided into a multiplicity of regions, each storing preidentified logic signals. In addition, the main memory unit 15 has certain regions reserved for control signals, the control signals being accessible to the processors. The use of a common main memory unit 15 for a plurality of processors is described as a "tightly coupled" system.

Referring next to FIG. 2, components of the processors relevant to the present invention are shown. The processor includes a system bus interface unit 21 that senses all the data (logic) signal groups applied to the system bus 19. The logic signals applied to the system bus 19 include information designating the target component to which an associated data signal group is to be applied within the target processor. The system bus interface unit 21 includes the apparatus for identifying when signals applied to the system bus 19 are to be transmitted to the processor with which the interface unit 21 is associated. The system bus interface unit 21 also includes apparatus for applying a signal, communicating to the source processor that the target processor has received the logic signals, to the system bus 19 by means of electrical path 29. This signal is generally referred to as the "acknowledge" signal. The data signals from the source processor are stored in a storage apparatus 22. Associated with the storage apparatus 22 is a storage cell 23, such as a register cell, that causes a signal to be applied within the target processor indicating that a data signal group is stored in the storage apparatus 22. The applied signal further indicates to the target processor that the signal group stored in the storage apparatus 22 is a command. The signals in the storage apparatus 22 are applied to decode logic 24. The signal from storage cell 23 is applied to switch 27. The output signals from switch 27 are applied to the decode logic 24 and to the processor instruction register 25. Output signals from the decode logic 24 are applied to a content addressable memory 26 and to interrupt apparatus 28. The interrupt apparatus 28 applies signals to the system bus interface unit 21 and the decode logic 24 applies signals to the system bus interface unit 21.

Referring once again to FIG. 2, the processor is shown as having a content addressable memory included therein. In the preferred embodiment, each processor includes two content addressable memories, one content addressable memory associated with data segments and one content addressable memory associated with data pages. The content addressable memories are used to translate a symbolic address, used by a program executing in a processor, to a physical address designating a location in the main memory unit 15. An appropriate command in storage apparatus 22 can invalidate a selected location or all the locations in a content addressable memory.

Referring next to FIG. 3, a flow diagram illustrating communication between two processors is shown. After the source processor identifies the requirement to communicate with the target processor in step 301, a software lock is set in step 302 in the operating system to prevent conflicting interprocessor communication. The source processor, for selected interprocessor communication sequences, prepares and stores data files in a predetermined main memory unit location, i.e. the target processor mailbox, in step 303. In step 304, the source processor executes the interprocessor instruction, the instruction causes the transfer of the command to the target processor in step 305. In step 305, the target processor acknowledges the receipt of the command after the transfer has taken place. If the acknowledge signal is not received, in step 307 the source processor once again attempts to transfer the command to the target processor via step 305. When the transfer of the command is successful, then the source processor continues with the current instruction sequence execution. This instruction sequence execution continues until a preselected activity and then performs the testing of the indicia in step 310. The target processor, after completion of the execution of the current instruction or instruction sequence, executes the command in step 308 identified by the transferred data signal group. In step 309, the target processor establishes an indicia available to the source processor indicating completion of the activity, i.e. execution of the transferred command. At a later period of time, the source processor tests, in step 310, the indicia set by the target processor to determine if the command designated by the transferred data signal group has been executed.

Referring next to FIG. 4, the format of the portion of the command transferred from the source processor to the target processor on the address lines of the system bus 19 is shown. The logic signal group is 16 bits in length. Bits 0 through 9 specify the identification number of the target processor. Bits 10 through 15 specify the function to be performed by the target processor. These functions include (0) flush (i.e., invalidate) the segment content addressable memory, (1) flush an entry in the segment content addressable memory, (2) flush the page content addressable memory, (3) set activity flag and place an entry in the interrupt queue and (4) flush an entry in the page content addressable memory.

Referring to FIG. 5a, 5b, and 5c, portions of the transferred command transferred over the data lines of the system bus 19 is shown. For functions 0 and 2, wherein the entire contents of a content addressable memory are invalidated, no additional information is needed. When the function requested by the source processor is (1) or (4), i.e. flush an entry in the segment or page content addressable memory, then the format of the second data signal group is shown in FIG. 5a and 5c respectively.. In FIG. 5a, data signal group bits in positions 2 through 11 specify the particular entry in the segment content addressable memory to be flushed. The data signals transferred in FIG. 5a and 5c are available to the source processor in software visible registers. In FIG. 5c, the designation of the particular page descriptor requires two signal groups, the page descriptor identified by positions 4 through 15 in the first signal group and positions 16 through 22 in the second signal group. As shown in FIG. 5b, when the function code (3) is transferred, in the associated signal group transferred over the data lines of the system bus 19, bits 0 through 9 identify the source processor while bits 10 through 15 designate the interrupt level. The system bus interface unit 21 includes apparatus to interpret the function code to determine if the data lines have logic signals applied thereto that are relevant to the process identified by the function code.

Referring next to FIG. 6, an organization of the memory locations in the main memory unit 15, associated with each processor, supporting the present invention is shown. At the time of initialization of the data processing system, the operating system allocates a group of memory locations 61 to a selected processor. The memory locations associated with each processor has allocated therein particular memory locations reserved for specified data signal group types. In particular, a plurality of locations 62 are reserved for activity flags. Similarly, a plurality of locations in the group of main memory locations associated with each processor are reserved as the mailbox 63 and store messages and requests from other processors.

Referring to FIG. 7, a diagram illustrating the operation of the present invention as a function of time is shown. The target processor executes a series of instructions 71, i.e., by loading the instruction register 25. At some point, the source processor executes the interprocessor instruction and transfers command 72 to the target processor. The completion of the command transfer will typically occur during the execution of a current instruction. After the current instruction has been executed, the target processor will execute the command 73 stored in storage apparatus 22. The target processor will then execute the next instruction in the sequence.

2. Operation of the Preferred Embodiment

In the present invention, interprocessor commands that can be executed by apparatus (hardware) are chosen. In addition, the interprocessor command s are chosen so that if the apparatus for non-software execution is not available, the apparatus can be added without excessive additional design complexity and without unacceptable additional apparatus. The content addressable memory location invalidation and a portion of an interrupt command are two interprocessor commands implemented in the preferred embodiment, however other interprocessor commands can be similarly processed by the present invention.

The present invention permits a greater independence of operation between the processors. This independence is achieved by selecting certain activity for use with the present invention. In particular, the preferred embodiment involves two types of interprocessor communication. In the first type of communication, the source processor informs the target processor that a certain address identified by the contents of a content addressable memory is no longer valid. The command transferred to the target processor then invalidates the address(es) designated by the source processor in the content addressable memory.

In the second type of communication, the source processor requires that the target processor gain access to data signal groups in the processor mailbox, for example, to execute a routine or program under the control of the source processor. In this interprocessor communication, the source processor transfers the request to the target processor mailbox for use by the target processor. The command transferred to the target processor in this second type of communication indicates the type of activity, i.e., the data groups in the main memory to be used by the target processor, and the priority level of the activity requested by the source processor. The designation of the priority level provides for an orderly execution of activity by the target processor and eliminates inappropriate interruption of activity by a lower level process.

In either type of communication, apparatus has been added to the processors so that the transferred command can be executed by the target processor without software intervention. The presence of a signal in the storage cell 23 prevents the instruction register 25 from executing the next instruction until the command stored in storage apparatus 22 has been executed. Appropriate decoding apparatus 24 has been added to the processors so that a content addressable memory can have either a selected or the entire contents invalidated. With respect to the command related to the request stored in the processor mailbox 63, the interrupt apparatus 28 tests the priority of the currently executing program against the priority of the request in the mailbox 63 while simultaneously loading appropriate activity flags 62 and a priority designation in the main memory location group associated with the target processor. When the request priority is higher than the currently executing program, then a full interrupt is executed by the processor and the request in the mailbox 63 will be executed next by the processor. If the priority of the request is lower than the priority of the currently executing program, then the currently executing program will continue in execution.

When the source processor originally transfers the data signal group, the receipt of the "acknowledge" signal permits the source processor to execute other instructions. According to the prior art, the operation of the source processor would be interrupted until confirmation that the requested operation was completed has been received. In the current invention, the source processor is free to execute other instructions after the identification of the "acknowledge" signal. The source processor does examine the contents of selected locations in the main memory unit 15 to insure that the requested operation has, in fact, taken place. But this examination can take place after other processing by the source processor, permitting more independent operation.

After execution of the invalidation of the contents of a location or locations in a content addressable memory, the command provides that an appropriate activity flag be set in a predefined location in main memory in order that the source processor can insure that the command has been executed. With respect to the command related to the processor interrupt, the command requires that activity flags, processor identification numbers and priority levels be stored in selected predefined main memory locations. The source processor can interrogate those locations to determine when the command has been executed, so that no independent signal need be set in the main memory unit to indicate completion of this command.

It will be clear that the apparatus added to implement the command transferred by the interprocessor instruction can be used by any processor in execution of internal activity, i.e. invalidating content addressable memory contents. Although the invention has been described in relation to the communication between processors, it will be clear that in the modern data processing systems many system components are being designed with logic signal manipulation capability. The technique described herein can be used for improved communication between any of the system components with appropriate processing capability.

The foregoing description is intended to illustrate the operation of the preferred embodiment and is not meant to limit the scope of the invention. The scope of the invention is to be limited only by the following claims. From the foregoing description, many variations would be apparent to one skilled in the art that would yet be encompassed by the spirit and scope of the invention.

What is claimed is:

1. A method for permitting a second central processing unit of a data processing system to generate a command instruction signal group, said command instruction signal group being executed by a first central processing unit, said method comprising the steps of:

identifying at least one preestablished condition in said second central processing unit;

generating a command signal group in said second central processing unit in response to and determined by said preestablished condition;

applying said command signal group and an associated address signal group to a system bus, said address signal group identifying said first central processing unit;

retrieving said command signal group from said system bus by said first central processing unit in response to identification of said address signal group;

storing said command signal group in a first central processing unit storage unit;

suspending instruction execution by said first central processing unit upon completion of a currently executing instruction signal group in response to storage of said command signal group in said storage unit;

decoding said stored command signal group to provide said control signals;

applying said control signals resulting from said decoding to said preselected component of an execution unit of said first central processing unit in response to said command signal group, wherein said control signals execute a instruction represented by said command signal group without software intervention; said control signals and said preselected component being determined by said command signal group, and resuming execution of said instruction signal group sequence upon completion of activity in said first central processing unit execution unit resulting from application of said control signals.

2. The method for permitting a second central processing unit to apply control signals to a preselected component of an execution unit of a first central processing unit of claim 1 further comprising a step of resuming execution of said instruction signal group sequence upon completion of activity in said first central processing unit execution unit resulting from application of said control signals.

3. A data processing system wherein a command instruction signal group generated in a first central processing unit is executed in a second central processing unit, said data processing system comprising:

a system bus; and a plurality of central processing units coupled to said system bus, said plurality of central processing units including a source central processing unit and a target central processing unit, said central processing units receiving signal groups from and applying signal groups to said system bus, each of said central processing units including;

execution apparatus for processing data signal groups in said each central processing unit in response to control signals resulting from decoding of instruction signal groups, wherein said source central processing unit includes condition apparatus for generating a command signal group in response to and determined by a preestablished condition in said source central processing unit, said command signal group being applied to said system bus along with a target central processing unit address signal group, said target central processing unit including an interface means for identifying said target processing unit address signal group and for storing said command signal group applied to said system bus having said target processing unit address signal group;

said target central processing unit including decode logic coupled to at least one preselected component of said second central processing unit execution apparatus, said decode logic decoding said stored command signal group, said decode logic applying control signals resulting from said decoding to said preselected component of said target central processing unit thereby executing said command signal group without software intervention, wherein storing said command signal group in said target central processing unit suspends execution by said execution apparatus of said target central processing unit of a currently executing instruction signal group sequence upon completion of a currently executing instruction signal group, wherein said control signals are applied to said preselected component upon completion of execution of said currently executing instruction signal group.

4. The data processing system of claim 3 wherein said target central processing unit further includes confirmation means for applying a confirmation signal group to said system bus indicating an activity resulting from said applying control signals has been completed.

5. In a multiprogrammed, multiprocessor data processing system, interprocessor command instruction apparatus in each processor whereby a source processor can apply control signals to preselected apparatus of an instruction execution unit of a target processor, each of said processors coupled to a system bus, said instruction execution unit of each of said processors processing data signal groups in response to instruction signal groups, said interprocessor command instruction apparatus comprising:

means for generating a command signal group in response to a preestablished processor condition, wherein said command signal group is determined by said preestablished condition;

transfer means for including an address signal group with said command signal group, said address signal group identifying a target processor, said transfer means applying said address signal group and said command signal group to said system bus;

storage means coupled to said system bus and responsive to said address signal group for storing said command signal group in said target processor;

signaling means responsive to said command signal group stored in said storage means for signaling to said target processor instruction execution unit a presence in said storage means of said command signal group, said signaling by said signaling means causing said target processor instruction execution apparatus to suspend instruction signal group execution upon completion of a currently executing instruction signal group; and decoding logic coupled between said storage means and said instruction execution unit apparatus, said decoding logic decoding said command signal group and applying control signals resulting from said decoding to said target processor instruction execution unit apparatus when said command signal group is stored in said storage means and target processor instruction execution is suspended, wherein said control signals cause an instruction identified by said command signal group to be executed by said target processor instruction execution unit apparatus without software intervention, wherein suspended execution of instruction signal groups is resumed in said target processor instruction execution unit upon completion of execution of said command signal group.

6. The interprocessor command instruction apparatus of claim 5 further comprising:

a main memory unit coupled to said system bus; and means in said target processor for applying a completion signal to said system bus when activity related to control signals applied by said decoding logic to said instruction execution unit apparatus has been completed, said completion signal stored in said main memory unit of said data processing system being accessible to said source processor.

7. The interprocessor command instruction apparatus of claim 6 further comprising means for determining a state of said completion signal by said source processor to determine when said related activity has been completed.

8. A data processing system having a plurality of processors and a main memory unit coupled by a system bus, said data processing system being capable of transferring signal groups from a first processor to an addressed processor of said plurality of processors, wherein each of said plurality of processors comprises:

processing means including an execution unit and an instruction register for executing instruction signal groups entered in said instruction register of said processing means;

identification means for identifying each of a plurality of preselected conditions in a processor, said identification means providing a command signal group in response to a preselected condition, said command signal group determined by said preselected condition;

a storage apparatus;

transfer means for transferring signal groups to and from said system bus, said transfer means of a first processor applying said command signal group and a related address signal group identifying an addressed processor to said system bus, said transfer means storing said command signal group from said system bus in said storage apparatus of said addressed processor when said related address signal group with said command signal group identifies an addressed processor which includes said transfer means;

decoding logic responsive to said command signal group in said storage apparatus for decoding said command signal group and for applying control signals resulting from said decoding to a preselected component of said execution unit, said control signals resulting in execution of an instruction identified by said command signal group in said addressed processor; and signal means coupled to said transfer means for signaling to said processing means a storage of said command signal group in said processor storage apparatus, said signal means causing said processing means to suspend instruction execution until completion of application of said control signals to said preselected component.

9. The data processing system of claim 8 further comprising indicator means for applying indicator signals to said system bus, said indicator signals designating completion of activity related to application of said control signals to said preselected component.

10. The data processing system of claim 8 wherein said command signal group stored in a current processor causes said current processor to execute a preestablished procedure on signal groups stored in a designated main memory area.

11. The data processing system of claim 9 wherein application of said control signals to said preselected component is performed during a next processor time period after storage of said command signal group in said storage apparatus.

12. The data processing system of claim 8 further including at least one content addressable memory, said decoding logic being coupled to said content addressable memory, control signals from said decoding logic causing at least one location in said content addressable memory to have an invalid signal stored therewith in response to storage of said command signal group in said storage apparatus.

13. The data processing system of claim 8 further including a storage unit for storing at least one signal relating to a priority level of processor activity resulting from storage of said command signal group, said processor further including comparison means for comparing said at least one priority signal with at least one signal representing a priority level of a sequence of instructions currently being executed by said processing means.

14. A data processing system having a plurality of processors, each processor including apparatus for applying control signals to a preselected component of instruction execution apparatus in said each processor, said control signals and said preselected component identified by a one of a plurality of command signal groups generated in a different processor, each command signal group generated in response to and determined by a preestablished condition in said different processor, said one command signal group being transferred to said each processor from said different processor, said each processor exchanging signals with said different processor by a system bus, said one command signal group to be transferred to said each processor from said different processor being applied to said system bus along with an address signal group identifying said each processor receiving said command signal group from said system bus, wherein instructions entered in said processor are executed by an instruction execution unit, said apparatus comprising:

interface means coupled to said system bus, said interface means for transferring said one command signal group from said system bus to a processor having said interface means when said address signal group with said one command signal group identifies said processor having the interface means;

storage apparatus for storing said one command signal group transferred by said interface means from said system bus;

decoder logic coupled to predetermined instruction execution unit apparatus and to said storage apparatus, said decoder logic decoding said one command signal group stored in said storage apparatus and applying control signals resulting from said decoding to said predetermined instruction execution unit apparatus, said control signals executing a command represented by said command signal group, said control signals and said predetermined instruction execution unit apparatus determined by said one command signal group; and apparatus responsive to a storing of said one command signal group in said storage apparatus for applying a first signal to said instruction execution unit, said first signal preventing further instruction execution following completion of a currently executing instruction by said instruction execution unit of instructions entered in said instruction execution unit until activity resulting from application of said control signals to said predetermined instruction execution unit apparatus is complete.

15. The data processing system of claim 14 wherein said each processor execution unit includes at least one memory unit, said decoder logic being coupled to said memory unit, wherein control signals from said decoder logic invalidate at least one location of said memory unit in response to and in a location determined by said one command signal group.

16. The data processing system of claim 14 wherein said data processing system includes a main memory unit coupled to said system bus, said decoder logic in response to said one command signal group providing signals to said processor interrupting instruction execution by said instruction execution unit and causing said processor interrupting instruction execution to process at least one signal group stored in a designated main memory location.

17. The data processing system of claim 16 wherein said decoder logic provides control signals resulting from said one command signal group for determining when to interrupt a sequence of instructions being executed by said instruction execution unit.

18. The data processing system of claim 14 wherein said one command signal group is an interprocessor command instruction generated by said second processor to cause said processor identified by said address signal group to perform an activity in said processor identified by said address signal group determined by said one command signal group.

* * * * *